March 31, 1959     G. KULICK     2,879,767
DEVICE FOR DELIVERING MEASURED QUANTITIES OF LIQUID
Filed Aug. 12, 1955     2 Sheets-Sheet 1
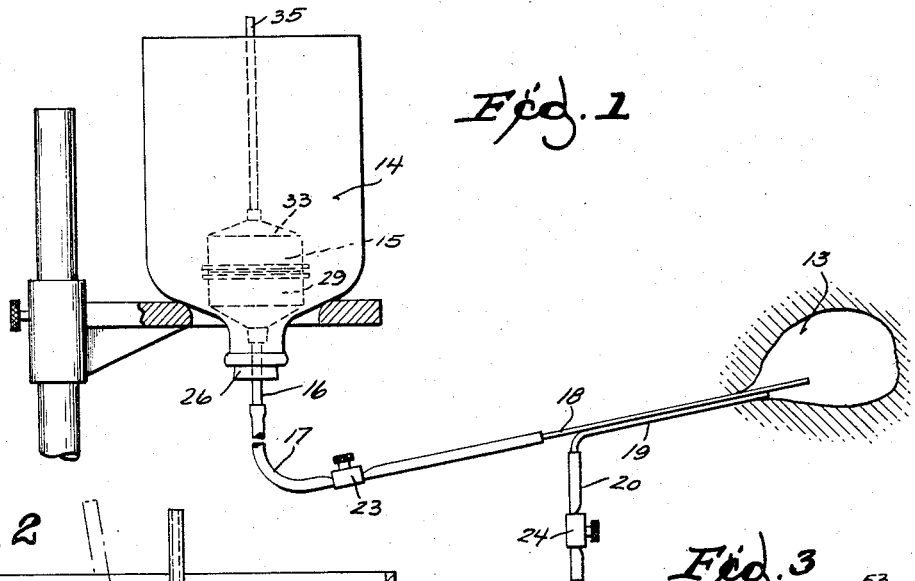
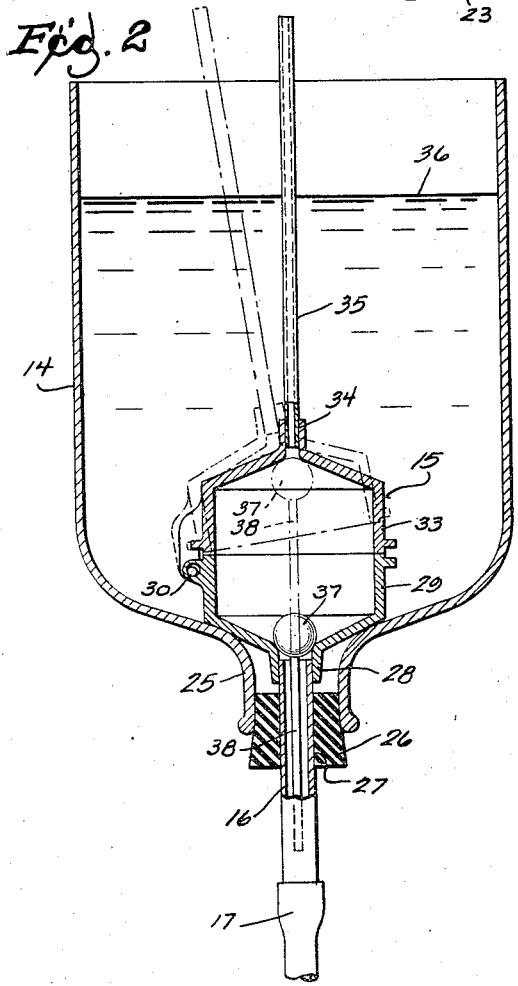
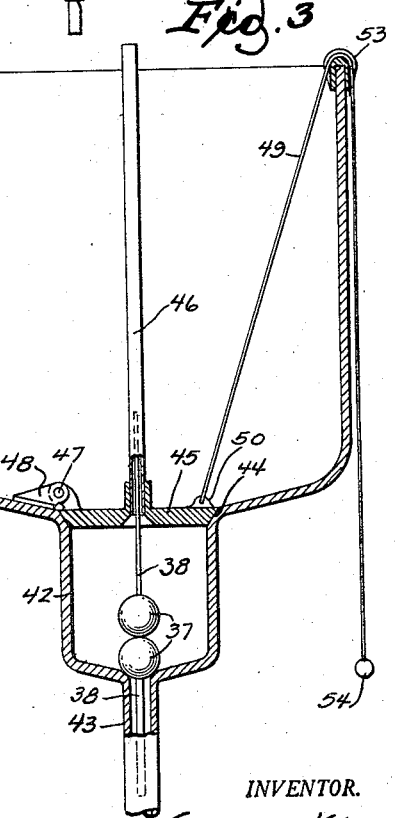
INVENTOR.
GEORGE KULICK
BY
Wheeler, Wheeler & Wheeler
ATTORNEYS March 31, 1959  G. KULICK  2,879,767
DEVICE FOR DELIVERING MEASURED QUANTITIES OF LIQUID
Filed Aug. 12, 1955  2 Sheets-Sheet 2
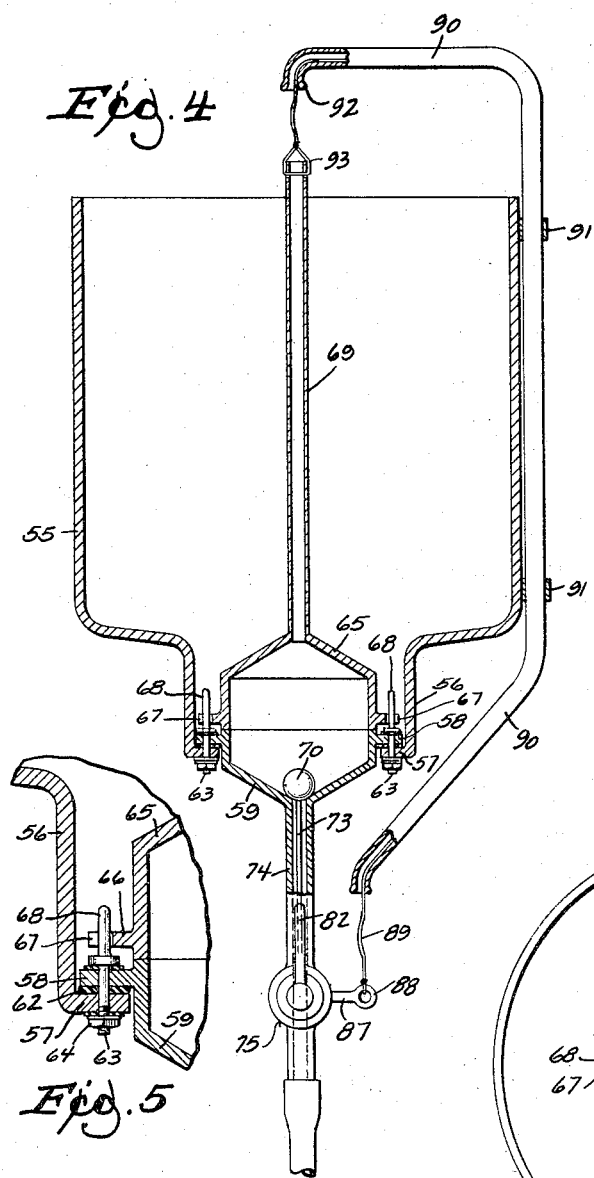
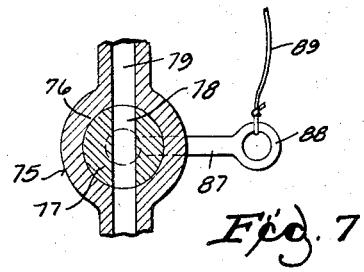
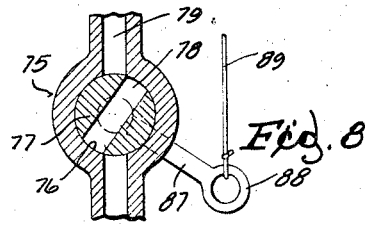
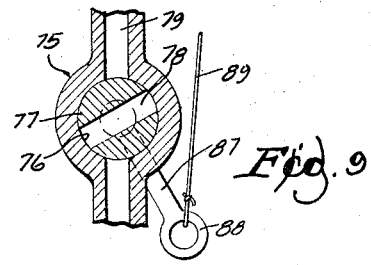
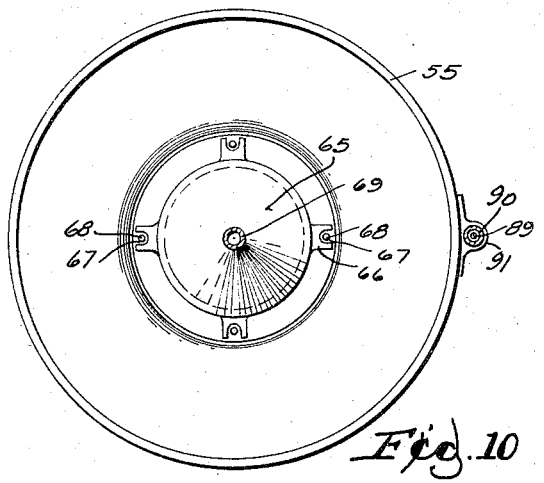
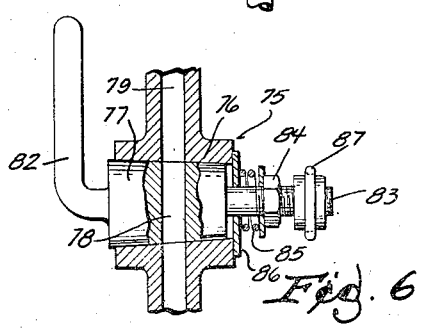
INVENTOR.
GEORGE KULICK
BY
Wheeler, Wheeler & Wheeler
ATTORNEYS

United States Patent Office 2,879,767
Patented Mar. 31, 1959

2,879,767

DEVICE FOR DELIVERING MEASURED QUANTITIES OF LIQUID

George Kulick, Pittsburgh, Pa.

Application August 12, 1955, Serial No. 528,062

10 Claims. (Cl. 128—227)

This invention relates to a device for delivering measured quantities of liquid.

While the invention is particularly adapted for use in hospitals in the embodiment about to be described, it is to be understood that the invention is not limited to medical or surgical use and has application wherever measured quantities of liquid are needed repeatedly and under such circumstances that the operator's attention should not be diverted to the task of measuring the quantity.

The invention resides in my novel combination of a storage vessel and a measuring chamber therewithin, the measuring chamber having an inlet valve of large capacity relative to the volumetric capacity of the chamber whereby the chamber will be filled substantially instantly upon valve actuation to place the device in immediate readiness to deliver a measured quantity of liquid.

In the instant device, I provide float valve means actuated by the rising and falling level of liquid in the measuring chamber to seal an air vent when the chamber is full and to seal an outlet when the chamber is empty.

The device of my invention may also be provided with novel interconnecting control means between the valve in the measuring chamber outlet and the measuring chamber valve whereby the measuring chamber valve is opened as part of a sequence of outlet valve operation to refill the measuring chamber and prepare it for a subsequent discharge of a measured quantity of liquid in a series of operating steps initiated by opening the outlet valve.

In the drawings:

Fig. 1 is a diagrammatic view, partly in cross section, showing the device of my invention set up for supplying repeated charges of measured quantities of liquid to a patient's bladder during the course of a cauterizing operation.

Fig. 2 is a vertical cross section taken through the storage vessel and measuring chamber of one embodiment of my invention.

Fig. 3 is a vertical cross section similar to Fig. 2 taken through a modified embodiment of my invention.

Fig. 4 is a vertical cross sectional view taken through a still further modified embodiment of my invention.

Fig. 5 is an enlarged fragmentary cross sectional view of a portion of the device shown in Fig. 4.

Fig. 6 is an enlarged fragmentary cross section, partly in elevation, taken through the valve in the measuring chamber outlet pipe.

Figs. 7, 8 and 9 are sequential views in fragmentary cross section of the valve of Fig. 6 showing the valve plug and control cord arm different positions.

Fig. 10 is a plan view of the modification shown in Fig. 4.

In performing certain operations on the bladder, diagrammatically illustrated by reference character 13 in Fig. 1, the bladder must be repeatedly distended and collapsed by successively filling it with charges of measured quantities of sterilized liquid, such as water, and draining the charge of liquid from the bladder. In the course of a bladder cauterizing operation it may be necessary to change the charge of liquid twenty or thirty times.

It is particularly important that the bladder not be overdistended in the course of the operation. Accordingly, it is highly desirable that only such quantity of liquid as will exactly fill the bladder be introduced into the bladder and that each successive charge of liquid be exactly the same quantity. Present-day manual control of the liquid supply is not entirely satisfactory because of the possibility of human error.

In the device of the present invention, however, the liquid is stored in a large storage vessel 14, liquid from the vessel being successively measured in the measuring chamber 15 and drained from the measuring chamber through the outlet pipe 16, outlet hose 17 and injection tube 18 which extends into the bladder 13. Outlet tube 19 also extends into the bladder, its external end being provided with a hose 20. In the embodiment of my invention shown in Fig. 1, the hose 17 may be manually controlled by the pinch valve 23, outlet hose 20 being provided with a like pinch valve 24.

The storage vessel 14 may have a large capacity, for example 10,000 or 15,000 ccs. The ordinary bladder will hold 400 ccs. of liquid when properly distended. Accordingly, the measuring chamber 15 is made to hold exactly 400 ccs., or any other desired quantity.

In the embodiment of the invention shown in Figs. 1 and 2, the storage vessel may simply comprise an inverted bottomless bottle having a restricted neck 25 which may be closed by a cork 26 having a bore 27. The bore 27 may receive the outlet pipe 16 which extends into the vessel 14 beyond the cork 26 for engagement with the outlet nipple 28 of the lower cup portion 29 of the measuring chamber 15. The cup portion 29 of the chamber is provided at one side with a hinge 30 on which the upper cup or cover 33 of the chamber is pivoted. The parting line between the cover 33 and bottom cup 29 may be midway therebetween as shown in Fig. 2, the mating edges thereof being machined for perfect fit. The cover 33 is provided with an air bleed nipple 34 in which an air bleed tube 35 is mounted. The air bleed tube 35 extends upwardly above the level of the liquid 36 in vessel 14 and may be used as a handle lever to pivot the cover 33 of the chamber about its hinge 30. The cover may be moved by its handle between its full line position shown in Fig. 2 to its dotted line position shown in Fig. 2. Accordingly, the cover 33 functions as a valve to fill the chamber with the liquid 36 in the storage vessel.

It is of particular importance that the intake area opened by the valve be substantial in comparison to the volumetric capacity of the measuring chamber. The cubic capacity of the chamber is desirably only about three times the cross sectional area of the cover. The angle through which the cover is tilted is desirably about 10° or more. The specific dimensions of the cover and measuring chamber, of course, may be altered by those skilled in the art provided only that the intake port of the chamber is large enough to provide for substantially instantaneous filling of the chamber. Accordingly, when the cover 33 is tilted to its dotted line position in Fig. 2, the measuring chamber will fill substantially instantaneously. Any air in the measuring chamber will vent to the atmosphere through the vent pipe 35.

I also provide a novel floating ball type valve 37 which alternately closes the outlet nipple 28 and the air bleed nipple 34. When the liquid in the measuring chamber drains therefrom because pinch valve 23 is opened, the ball valve 37 will descend with the falling level of liquid in the chamber to its full line position in Fig. 2 in which it seals the chamber outlet. When the chamber is filled, the ball valve 37 will rise with the rising level of liquid to its dotted line position to close the air vent nipple 34.

I may optionally provide the ball valve 37 with a stem 38 which extends into the outlet pipe 16 to guide the ball valve in its movement. Accordingly, the ball valve 37 will be accurately guided between its full and dotted line positions and cannot escape from the chamber. As shown in Fig. 3 I may optionally provide two float ball valves 37, one for the chamber outlet and one for the air vent, each to be provided with guide stems 38 respectively slidable in the outlet pipe and air vent tube.

In Fig. 3 I disclose a modified embodiment in which the storage vessel 41 is fabricated with an integral measuring chamber 42 having an outlet passage 43. The shoulder 44 of the measuring chamber is machined to provide a seat for the trap door valve 45 which has air vent stem 46 mounted thereon. Valve 45 may be hinged on a pin 47 mounted on a bracket 48 cemented or otherwise mounted on the wall of the vessel 41.

Trap door 45 may be manipulated by its air vent tube 46 or by pulling on a cord 49 connected to ear 50 on the trap door. The cord is trained over a pulley 53 mounted on the upper rim of the vessel 41. The cord may be provided with a pull ring 54.

In the embodiment of the invention shown in Fig. 3 the valve 45 has a large inlet area relative to the volumetric capacity of the chamber 42, as in the previously described embodiment. Accordingly the measuring chamber will fill substantially instantaneously.

In both embodiments of the invention thus far described the bladder 13 is successively distended and relaxed by manipulating the pinch valves 23, 24 and pivoting the intake valve on the measuring chamber. To fill the bladder pinch valve 24 is closed and pinch valve 23 opened. Liquid in the measuring chamber will then flow into the bladder, a ball valve 37 closing the chamber outlet when the chamber is empty. The operator then simply closes pinch valve 23 and tilts the inlet valve on its pivot to refill the chamber. The bladder 13 is emptied by opening pinch chamber 24 and the process may then be repeated by closing pinch valve 24 and opening pinch valve 23, etc. In this manner successive charges of measured quantities of liquid may be introduced into the bladder.

In Fig. 4 I show another modified embodiment of the invention in which the act of manipulating the valve in the line from the measuring chamber to the bladder also manipulates the intake valve of the measuring chamber. In this embodiment of the invention the storage vessel 55 has a neck 56 with an inturned flange 57 providing a seat for the out-turned flange 58 of the separate measuring chamber base cup 59. Fluid tight gasket 62 may intervene between the respective flanges 57, 58. The respective flanges may be bolted together by means of a series of bolts 63 having nuts 64.

In this embodiment of the invention the top cap or cover 65 of the measuring chamber may be moved rectilinearly with respect to the bottom cup 59 instead of pivoting it as in the previous embodiments. For this purpose the top cover 65 may be provided with radially extending guide lugs 66 having sockets 67 embracing the vertical stems 68 which may be formed as extensions of the mounting bolts 63. The cover 65 is provided with an air bleed tube 69 which also serves as a handle for lifting and lowering the cover 65 on the measuring chamber cup 59.

The chamber 59 is provided with a floating ball valve 70 and a stem 73 which is guided in the outlet pipe 74 of the chamber cup 59, as in the embodiment of Fig. 2.

It is clear that the hinged covers of the embodiments of Figs. 1 through 3 could be replaced by a rectilinearly movable cover of the type shown in Fig. 4, the hinges of Figs. 1 through 3 being replaced by the stems 68 and guides 66 of the device shown in Fig. 4.

Instead of the pinch valve 23, shown in Fig. 1, the device of Fig. 4 may be provided with a valve 75 shown in Fig. 6 which includes a tapered valve seat 76 having a tapered valve plug 77 with a valve bore 78 which aligns in one position with the bore 79 of the valve to pass liquid therethrough. In a transverse position the plug 77 blocks the bore 79. The valve structure is conventional in most respects, the valve plug 77 being provided with a control handle 82 and with a threaded mounting shaft 83 on the axis of plug rotation on which nut 84 is adjustable to press spring 85 against washer 86 seated against the end of the valve seat 76.

In the specific device of the present invention, however, I add to the threaded stem 83 a second handle or arm 87 having an eye 88 to which a cord 89 is connected. Cord 89 is threaded through a tubular guide 90, the guide 90 being mounted on the vessel 55 by means of the brackets 91. Tube 90 has its outlet 92 directly over the exposed end of the air bleed tube 69 to which the end of cord 89 is connected at 93.

As shown in Figs. 4 and 7 the cord 89 is slack when the valve plug bore 78 aligns with the valve seat bore 79. Accordingly, the valve may be moved to its closed position shown in Fig. 8, the movement of the valve plug being such as to take up the slack in the cord 89. Further movement of the valve to its position in Fig. 9, in which the valve remains shut off, will tension cord 89 to lift the cover 65 of the measuring chamber.

Accordingly, in the device of Figs. 4 through 10, pinch valve 23 may be dispensed with, the flow of liquid from the measuring chamber to the bladder being controlled by valve 75. The sequence of operations is as follows: Assuming the measuring chamber to be full, valve 75 is moved to its Fig. 7 position. Liquid will then drain from the measuring chamber 59 into the bladder. Float valve 70 will close off the measuring chamber when flow has ceased.

The valve handle 82 may then be turned to move the valve plug successfully to its positions shown in Figs. 8 and 9 in which the line 17 to the bladder will be closed and the intake valve to the measuring chamber opened. Because the chamber fills substantially instantaneously the operator need only hold the lever 82 in the position of the valve shown in Fig. 9 for only an instant. He may then release the valve handle 82 and the weight of the parts will return the valve to its Fig. 8 position in which valve 75 is closed and the intake valve 65 to the measuring chamber is also closed. In due course the bladder may be emptied by opening pinch valve 24, and the measured charge of liquid introduced into the bladder by then closing pinch valve 24 and placing valve 75 in its Fig. 7 position. The sequence of operations may then be repeated at the will of the operator to introduced successive charges of measured quantities of liquid into the bladder.

I claim:

1. Apparatus for delivering a measured quantity of liquid, said apparatus comprising a liquid storage vessel, a measuring chamber having a movable top, an outlet, an air vent formed in said movable top and an intake port exposed to the liquid in the vessel and for which the said top constitutes a valve, means for opening and closing said top valve to admit a measured amount of liquid from the storage vessel into the measuring chamber, said port having such intake capacity with respect to the volumetric capacity of the chamber that the chamber will fill substantially instantaneously when the intake valve is opened, and a float valve for said air vent which will be borne by the rising level of liquid in said chamber to close the air vent when the intake valve is opened and which will fall away from said air vent when the liquid content of the chamber is released through said outlet.

2. Apparatus for delivering a measured quantity of liquid, said apparatus comprising a liquid storage vessel, a measuring chamber in said vessel, said chamber having an outlet, an air vent and an intake valve exposed to the liquid in the vessel, means for opening and closing said intake valve to admit a measured amount of liquid from the storage vessel into the measuring chamber, said intake valve having such intake capacity with respect to the volumetric capacity of the chamber that the chamber will fill substantially instantaneously when the intake valve is opened, said measuring chamber comprising a cup having a cover which constitutes said valve, said valve further comprising a hinge on which said cover pivots with respect to the cup, said air vent comprising a tube mounted on the cover and extending above the level of the liquid in the storage vessel and serving as a handle for manipulating the cover.

3. Apparatus for delivering a measured quantity of liquid, said apparatus comprising a liquid storage vessel, a measuring chamber in said vessel, said chamber having an outlet, an air vent and an intake valve exposed to the liquid in the vessel, means for opening and closing said intake valve to admit a measured amount of liquid from the storage vessel into the measuring chamber, said intake valve having such intake capacity with respect to the volumetric capacity of the chamber that the chamber will fill substantially instantaneously when the intake valve is opened, said measuring chamber comprising a cup having a cover which constitutes said valve, said valve further comprising slide pins aligned in the direction of cover movement, said cover having bearings on said pins on which said cover reciprocates to and from closure with said cup.

4. Apparatus for delivering a measured quantity of liquid, said apparatus comprising a liquid storage vessel, a measuring chamber in said vessel, said chamber having an outlet, an air vent and an intake valve exposed to the liquid in the vessel, means for opening and closing said intake valve to admit a measured amount of liquid from the storage vessel into the measuring chamber, said intake valve having such intake capacity with respect to the volumetric capacity of the chamber that the chamber will fill substantially instantaneously when the intake valve is opened, said storage vessel being provided with a neck and a cork closure therefor, said measuring chamber comprising a cup and cover prefabricated entirely independently of the storage vessel, the outlet of the measuring chamber comprising a tube connected to said cup, said cork having a bore in which said tube is mounted.

5. Apparatus for delivering a measured quantity of liquid, said apparatus comprising a liquid storage vessel, a measuring chamber in said vessel, said chamber having an outlet, an air vent and an intake valve exposed to the liquid in the vessel, means for opening and closing said intake valve to admit a measured amount of liquid from the storage vessel into the measuring chamber, said measuring chamber being provided with float valve means for said outlet and air vent, said means being lifted by the rising level of liquid in said chamber to close the air vent when the chamber is full of liquid, said means being lowered as the liquid drains from the outlet whereby to lower the float against the outlet to seal the outlet when the chamber is empty.

6. Apparatus for delivering a measured quantity of liquid, said apparatus comprising a liquid storage vessel, a measuring chamber in said vessel, said chamber having an outlet, an air vent and an intake valve exposed to the liquid in the vessel, means for opening and closing said intake valve to admit a measured amount of liquid from the storage vessel into the measuring chamber, in combination with an outlet line connected to said chamber outlet, an outlet valve in said line, means for actuating said outlet valve to release liquid from said chamber for use, and means interconnecting said valve actuating means with the means for opening said chamber inlet valve for sequentially closing said outlet line valve while the inlet valve remains closed and thereafter opening said inlet valve while the outlet valve remains closed to refill the measuring chamber.

7. Apparatus for delivering a measured quantity of liquid, said apparatus comprising a liquid storage vessel, a measuring chamber in said vessel, said chamber having an outlet, an air vent and an intake valve exposed to the liquid in the vessel, means for opening and closing said intake valve to admit a measured amount of liquid from the storage vessel into the measuring chamber, in combination with an outlet line connected to said chamber outlet, an outlet valve in said line, means for actuating said outlet valve to release liquid from said chamber for use, and means interconnecting said valve actuating means with the means for opening said chamber inlet valve for sequentially closing said outlet line valve and opening said inlet valve to refill the measuring chamber, said outlet valve having an arm, said interconnecting means comprises a line connected to said arm and to the means for opening said inlet valve.

8. The device of claim 7 in which said line is normally slack when said outlet valve is open whereby said arm does not tighten said line until the valve has closed.

9. A device for supplying a measured quantity of liquid to the bladder of a patient, said device comprising inlet and outlet tubes adapted for insertion into the bladder, said tubes being provided with control valves, a liquid storage vessel and a measuring chamber in said vessel and having an outlet connected to the bladder inlet tube, said measuring chamber having an inlet valve exposed to the liquid in the vessel of capacity large enough with respect to the volumetric capacity of the chamber that the measuring chamber will fill substantially instantaneously when said inlet valve is opened.

10. The device of claim 9 in which said measuring chamber is provided with an air vent and float valve means selectively blocking and opening the chamber outlet and air vent in response to the rising and falling level of liquid in said chamber.

References Cited in the file of this patent

UNITED STATES PATENTS

| | | |
|---|---|---|
| 362,393 | Muller | May 3, 1887 |
| 430,514 | Cook | June 17, 1890 |
| 524,900 | James | Aug. 21, 1894 |
| 1,595,822 | Du Charme | Aug. 10, 1926 |
| 2,322,912 | Berman | June 29, 1943 |
| 2,565,045 | Ray | Aug. 21, 1951 |